(12) United States Patent
Ramseyer et al.

(10) Patent No.: US 11,802,785 B2
(45) Date of Patent: Oct. 31, 2023

(54) INTERFACE FOR CONNECTING A FLUID MEASUREMENT POINT AND A MODULAR FLUID MEASUREMENT SYSTEM

(71) Applicant: Endress+Hauser Flowtec AG, Reinach (CH)

(72) Inventors: Severin Ramseyer, Münchenstein (CH); Christian Schütze, Basel (CH); Jean-Claude Chevrolet, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 282 days.

(21) Appl. No.: 17/268,588

(22) PCT Filed: Jul. 30, 2019

(86) PCT No.: PCT/EP2019/070475
§ 371 (c)(1),
(2) Date: Feb. 15, 2021

(87) PCT Pub. No.: WO2020/035305
PCT Pub. Date: Feb. 20, 2020

(65) Prior Publication Data
US 2021/0172781 A1    Jun. 10, 2021

(30) Foreign Application Priority Data
Aug. 16, 2018 (DE) .................... 10 2018 119 887.6

(51) Int. Cl.
*G01F 15/18* (2006.01)
*F16L 41/00* (2006.01)
*G01F 1/84* (2006.01)

(52) U.S. Cl.
CPC .......... *G01F 1/8413* (2013.01); *F16L 41/008* (2013.01); *G01F 15/185* (2013.01)

(58) Field of Classification Search
None
See application file for complete search history.

(56) References Cited

U.S. PATENT DOCUMENTS

2003/0225538 A1  12/2003  Baker et al.
2006/0010991 A1   1/2006  Woods et al.
(Continued)

FOREIGN PATENT DOCUMENTS

DE         69522145 T2   6/2002
DE      102005006709 A1  8/2006
(Continued)

*Primary Examiner* — Harshad R Patel
(74) *Attorney, Agent, or Firm* — Christopher R. Powers; Endress+Hauser (USA) Holding, Inc.

(57) ABSTRACT

An interface adapted for connecting a fluid measurement point includes a body including at least two connection locations, wherein the body has fluid ducts, each of which has a connection location, wherein the fluid ducts have at their connection locations first duct axes, wherein the connection locations are especially coplanar, wherein the connection locations are adapted for connecting process connectors from a connection direction for sealed communication with the fluid ducts, wherein the fluid ducts are adapted via the process connectors to supply, and drain, a medium, respectively, to and from the fluid measurement point, wherein the interface has at least one holding element for releasably securing at least one process connector to the body, wherein the holding element has at least one process connector seat, wherein the holding element is adapted to be moved into an end position (EP) effecting the securement.

17 Claims, 10 Drawing Sheets

(56) References Cited

U.S. PATENT DOCUMENTS

2007/0234824 A1* 10/2007 Bitto .................... G01F 1/8409
  73/861.355
2010/0116065 A1   5/2010 Mecke et al.

FOREIGN PATENT DOCUMENTS

| | | |
|---|---|---|
| DE | 202009016421 U1 | 4/2011 |
| DE | 202009016421 U1 | 5/2011 |
| EP | 1391701 A2 | 2/2004 |
| JP | 2014106180 A | 6/2014 |
| WO | 0161282 A2 | 8/2001 |
| WO | 2014092701 A1 | 6/2014 |

* cited by examiner

INTERFACE FOR CONNECTING A FLUID MEASUREMENT POINT AND A MODULAR FLUID MEASUREMENT SYSTEM

CROSS-REFERENCE TO RELATED APPLICATIONS

The present application is related to and claims the priority benefit of German Patent Application No. 10 2018 119 887.6, filed on Aug. 16, 2018, and International Patent Application No. PCT/EP2019/070475 filed on Jul. 30, 2019, the entire contents of which are incorporated herein by reference.

TECHNICAL FIELD

The invention relates to an interface for connecting a fluid measurement point and to a modular fluid measurement system comprising the interface and a fluid measurement point connected thereto.

BACKGROUND

In laboratories, in which properties of media, such as, for example, density or viscosity, are to be determined by means of fluid measurement systems, fluid measurement points are connected to an interface, via which a medium to be investigated is supplied to the fluid measurement point and then drained away.

The manufacture of a mechanical connection between the interface and the fluid measurement point is complicated in the state of the art. Thus, sometimes screws are led through an interface body and engage in corresponding screw threads in a fluid measurement point housing. This requires a manual maneuvering of the interface and the fluid measurement point relative to one another. Moreover, the provision of screw threads in a fluid measurement point housing results in openings to an inner space of the housing, whereby a contamination of the fluid measurement point in the inner space and a fluid measurement point failure become more probable. Additionally, clamping forces transmitted by means of the screw thread from the screws to the fluid measurement point can disturb measurement operation of the fluid measurement point.

SUMMARY

An object of the invention, consequently, is to provide, first, an interface for connecting a fluid measurement point and, second, a modular fluid measurement system comprising the interface and the fluid measurement point, wherein manufacture of a robust and sealed mechanical connection is simplified and fluid measurement point safety is increased.

An interface of the invention adapted for connecting a fluid measurement point comprises:

a body, which has at least two connection locations, wherein the body has fluid ducts, each of which has a connection location, wherein the fluid ducts have at their connection locations first duct axes, wherein the connection locations are especially coplanar, wherein the connection locations are adapted for connecting process connectors from a connection direction for sealed communication with the fluid ducts, wherein the fluid ducts are adapted via the process connectors to supply, and drain, a medium, respectively, to and from the fluid measurement point, wherein the interface has at least one holding element for releasably securing at least one process connector to the body, wherein the holding element has at least one process connector seat, wherein the holding element is adapted to be moved into an end position effecting the securing.

In an embodiment, the body includes for each connection location a first support and a second support on an opposite side of the connection location, wherein the first support and the second support are adapted to support the holding element at least in the end position, wherein the first support and the second support are adapted to provide a hold in the connection direction against movement away from the body.

In an embodiment, the first support includes at least a first support surface, against which an opposite surface of the holding element is kept in its end position by shape interlocking, wherein the second support includes at least a second support surface, against which an opposite surface of the holding element is kept in its end position by shape interlocking.

In an embodiment, the first support includes at least a first projection having at least a first cantilever, wherein the first projection extends above a first surroundings at least in certain regions, and wherein the first cantilever covers the first surroundings at least in certain regions, wherein the first cantilever defines the first support surface, and/or wherein the second support includes at least a second projection having at least a second cantilever, wherein the second projection extends above a second surroundings at least in certain regions, and wherein the second cantilever covers the second surroundings at least in certain regions, wherein the second cantilever defines the second support surface.

In an embodiment, the first support is arranged between the connection locations.

In an embodiment, the first support includes for the holding element a first rotation axis of the holding element extending perpendicularly to the connection direction, wherein the holding element is adapted by means of a rotational movement around the first rotation axis to be moved from the starting position into the end position.

In an embodiment, the second support includes at least a first bore for receiving a screw, by means of which the holding element is secureable, wherein the holding element has at least a second bore for receiving a screw.

In an embodiment, the cantilever includes on a body facing surface a rib, which is adapted to establish the rotation axis, wherein a cross-sectional profile of the rib is, for example, triangular, semicircular or semielliptical.

In an embodiment, the first support is a radial support, wherein a radial support axis is in parallel with the connection direction, wherein the radial support secures the holding element against movement in the direction of the radial support axis by shape interlocking.

wherein the holding element is adapted by means of a rotary movement around the radial support axis to be moved into the end position.

In an embodiment, the holding element is adapted to be moved into the end position by means of a linear movement perpendicularly to the connection direction.

In an embodiment, the holding element is at least sectionally wedge shaped in its end position in the region of the process connection seat, wherein in the wedge-shaped region a surface of the holding element facing toward the body is inclined in the connection direction.

In an embodiment, the interface includes a seal, for example, a sealing ring, for at least one connection location.

In an embodiment, the connection location includes a counterbore, which has a seal seat.

In an embodiment, the holding element is disc shaped or plate shaped.

In an embodiment, the body comprises at least two body elements, wherein each body element has at least one connection location and an associated fluid duct, wherein the body elements are separately connectable with the fluid measurement point.

A modular fluid measurement system of the invention comprises:
a fluid measurement point having at least two process connectors; and
an interface as described in one of the variants above,
wherein the at least one holding element is adapted to press at least one process connector against an associated connection location;
wherein the at least one process connector seat of a holding element is adapted to be connected with an associated process connector by shape interlocking.

In an embodiment, the holding element is adapted to contact at least one bearing surface of the process connector.

In an embodiment, a shape of the counterbore is at least sectionally complementary to an external shape of the process connector,
whereby a tight seating of the process connector perpendicular to a connection direction of the process connector is assured.

In an embodiment, the fluid measurement point comprises a Coriolis measurement device, which is adapted to measure a mass flow and/or a density of a medium flowing through a measuring tube of the Coriolis measurement device.

BRIEF DESCRIPTION OF THE DRAWINGS

The invention will now be described based on examples of embodiments presented in the appended drawing, the figures of which show as follows.

DETAILED DESCRIPTION

Figure 1:
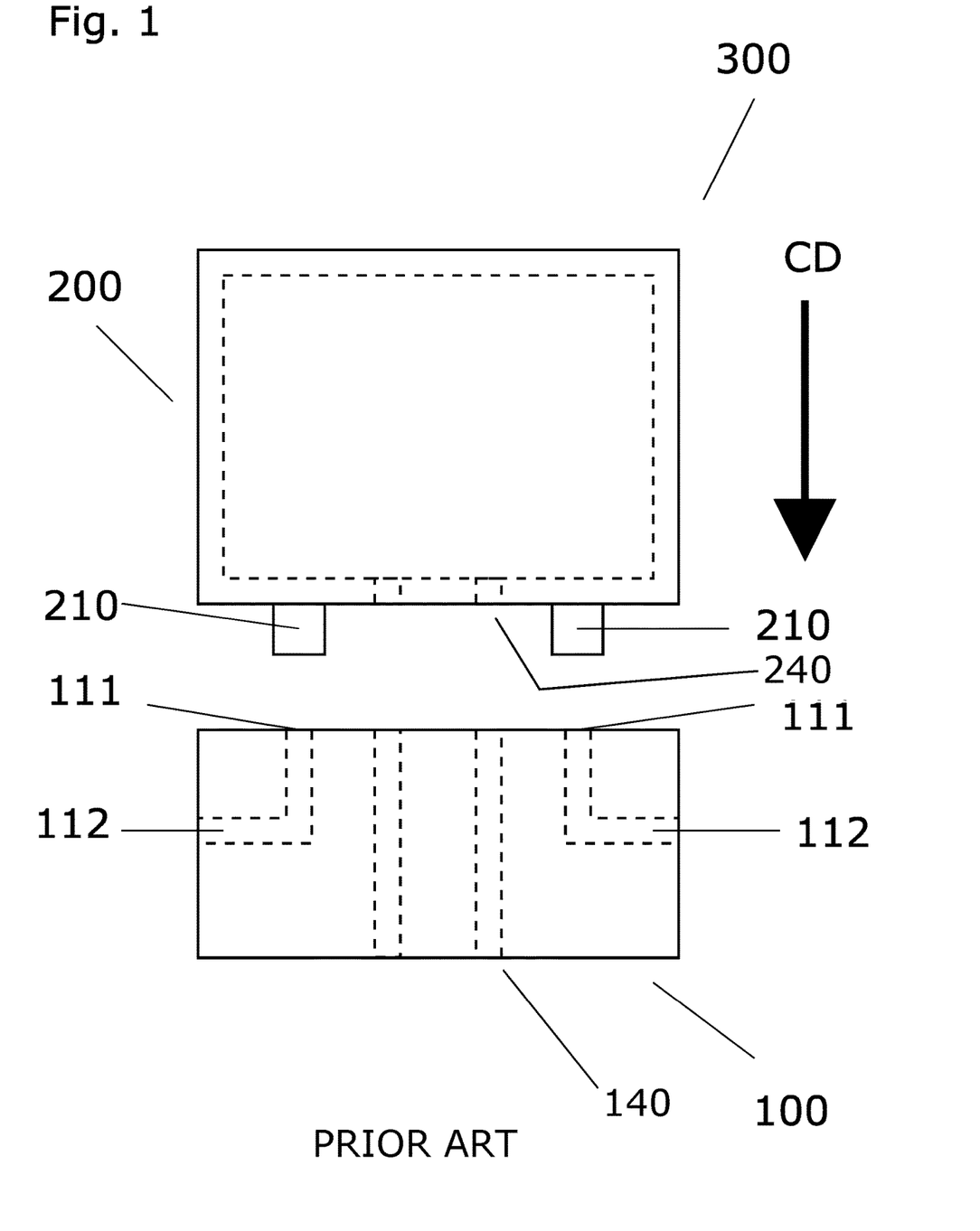
FIG. 1 shows a front view of a modular fluid measurement system according to the state of the art.

FIG. 1 shows a front view of a conventional modular fluid measurement system 300, in the case of which a fluid measurement point 200 is connected to an interface 100 from a connection direction CD, in order by means of fluid ducts 112 to supply, and drain, a medium, respectively, to and from the fluid measurement system via process connectors 210. The process connectors can, for example, in the case of flow measurement devices or Coriolis measurement devices for measuring the density and/or the mass flow of a medium, be connected with at least one measuring tube, which is adapted to lead the medium to be measured through the flow measurement device, or through the Coriolis measurement device. For securing the fluid measurement point to the interface, screws are led through bores 140 in the interface and engage in bores 240 provided therefor in a housing wall of a housing of the fluid measurement point. Such is unsatisfactory for at least two reasons. The manual maneuvering of the fluid measurement point into connection with the interface is cumbersome, and the introduction of bores into the housing wall of the fluid measurement point is undesirable, since this risks contamination of an inner space of the fluid measurement point. Moreover, clamping forces resulting from the screwed assembly can sensitively disturb measurement operation of the fluid measurement point. For example, in the case of a Coriolis measurement device, oscillation characteristics of a medium-containing measuring tube are measured and under action of clamping forces they can change in a difficultly predictable manner.

Figure 2:
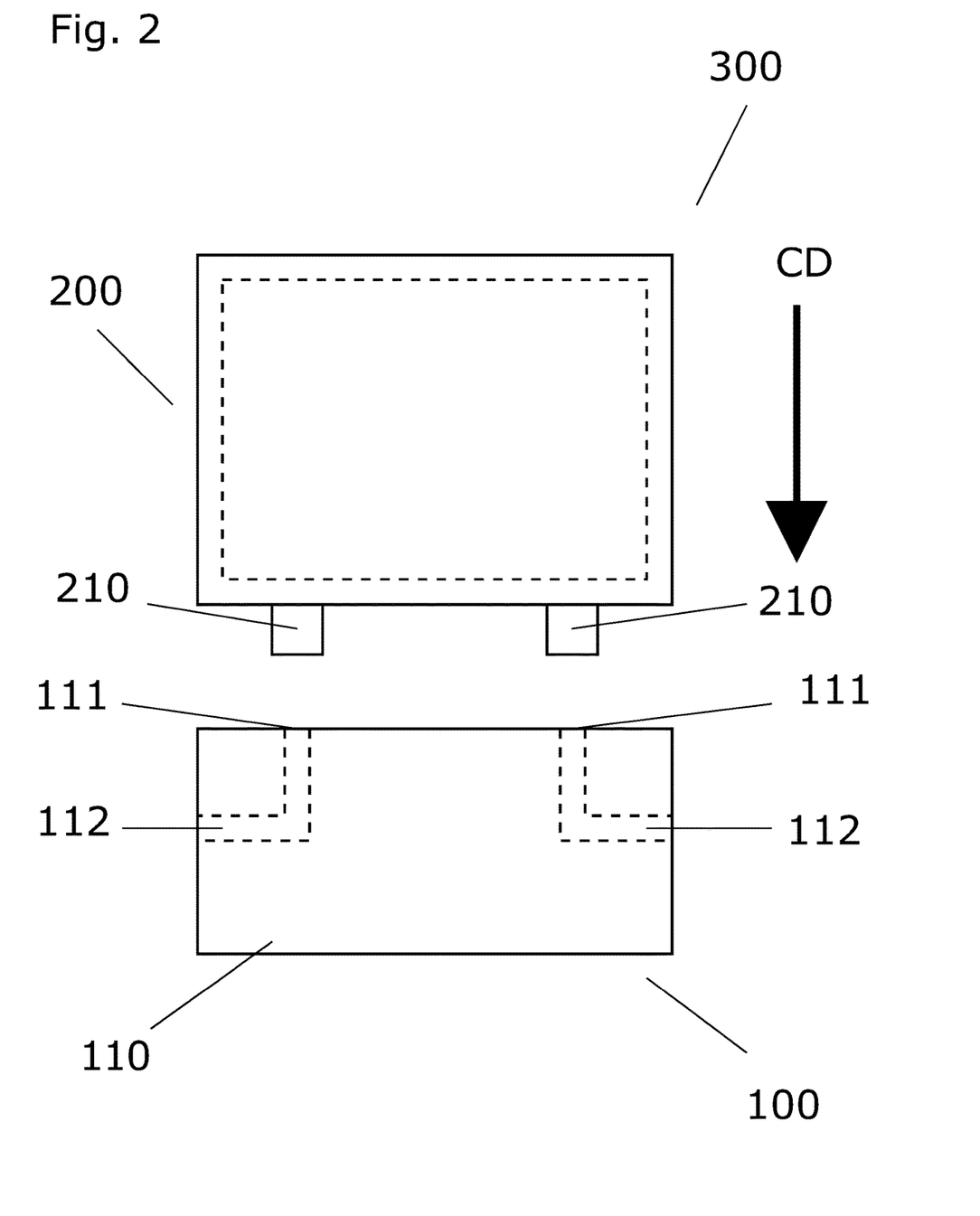
FIG. 2 shows a front view of an example of the modular fluid measurement system of the present disclosure.

A goal of the invention is to provide an interface 100 and a modular fluid measurement system 300, by means of which the discussed problems are solved, and, for example, such as shown in FIG. 2, no screws need to pass through the interface into a housing of the fluid measurement point.

The solution of the discussed problems is shown in FIGS. 3 to 12, wherein at least one holding element 120 (see FIGS. 9, 10 and 12) of the interface is adapted to press the process connectors 210 of the fluid measurement point against terminal opening regions of the fluid ducts. The holding element is, for its part, supported at least in an end position by means of a first support 114.1 and by means of a second support 114.2 against movement counter to the connection direction.

Figure 3:
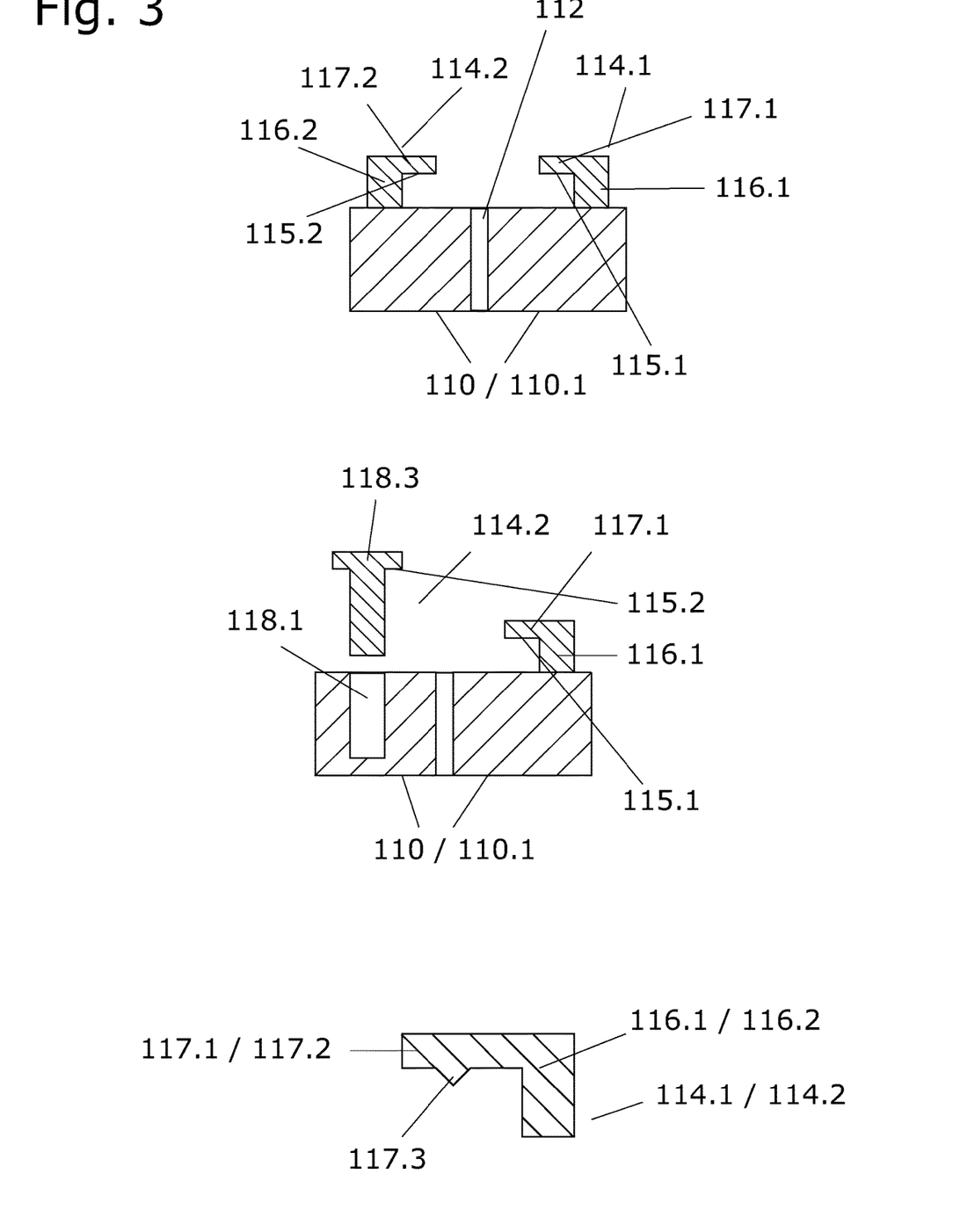
FIG. 3 shows by way of example, sections through a first support and second support taken with a cutting plane shown in FIG. 8.
Figure 8:
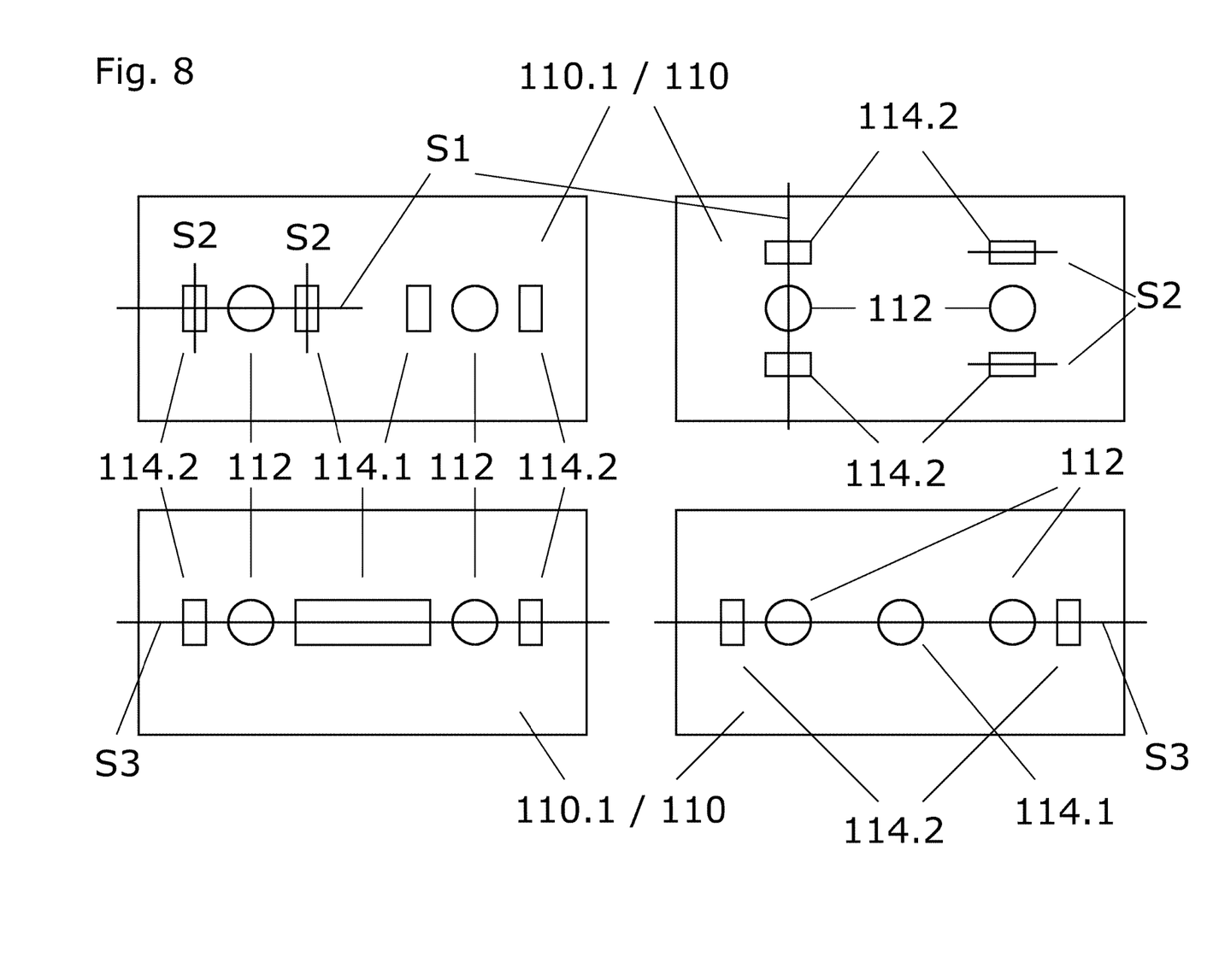
FIG. 8 shows, by way of example, orientations and embodiments of first supports and second supports of an interface of the present disclosure relative to corresponding fluid ducts.

FIG. 3 shows possible embodiments of the first support and the second support, which are arranged on opposite sides of a fluid duct 112, wherein the views show sections taken according to cutting planes S1 of FIG. 8. Thus, such as shown in the upper view, the first support 114.1 can have a first projection 116.1 having a first cantilever 117.1 providing a first support surface 115.1 for the holding element, and, correspondingly, the second support 114.2 can have a second projection 116.2 having a second cantilever 117.2 providing a second support surface 115.2 for the holding element.

Alternatively, such as shown in the middle view, the second support 114.2 can also have a first bore 118.1 in the body 110, or in the body element 110.1, wherein a screw 118.3 of the interface is adapted to engage in the first bore and secure the holding element 120.

The first cantilever 117.1, or the second cantilever 117.1, can, such as shown in the lower view, have a rib 117.3, which defines a stop. The rib can, such as shown here, have a triangular cross-sectional profile. Alternatively, the cross-sectional profile can also be semicircularly shaped or semielliptical.

Figure 4:
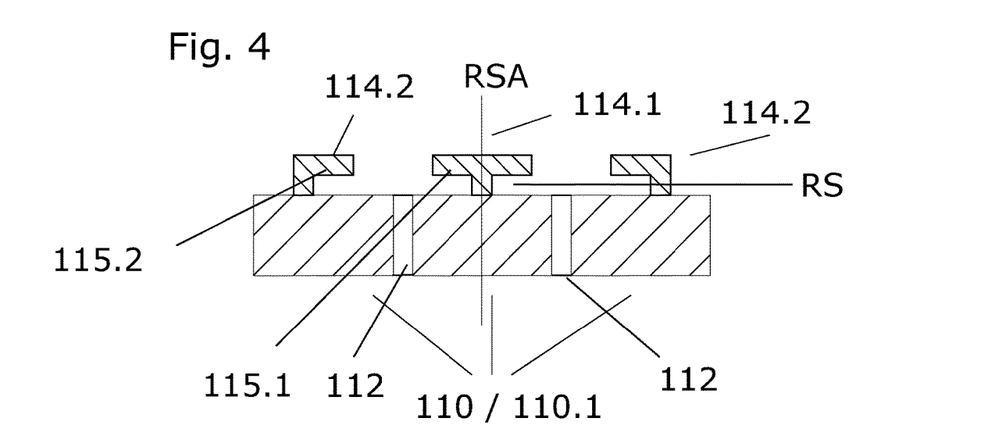
FIG. 4 shows an example of a section through a first support and second support taken with a cutting plane shown in FIG. 8.
Figure 10:
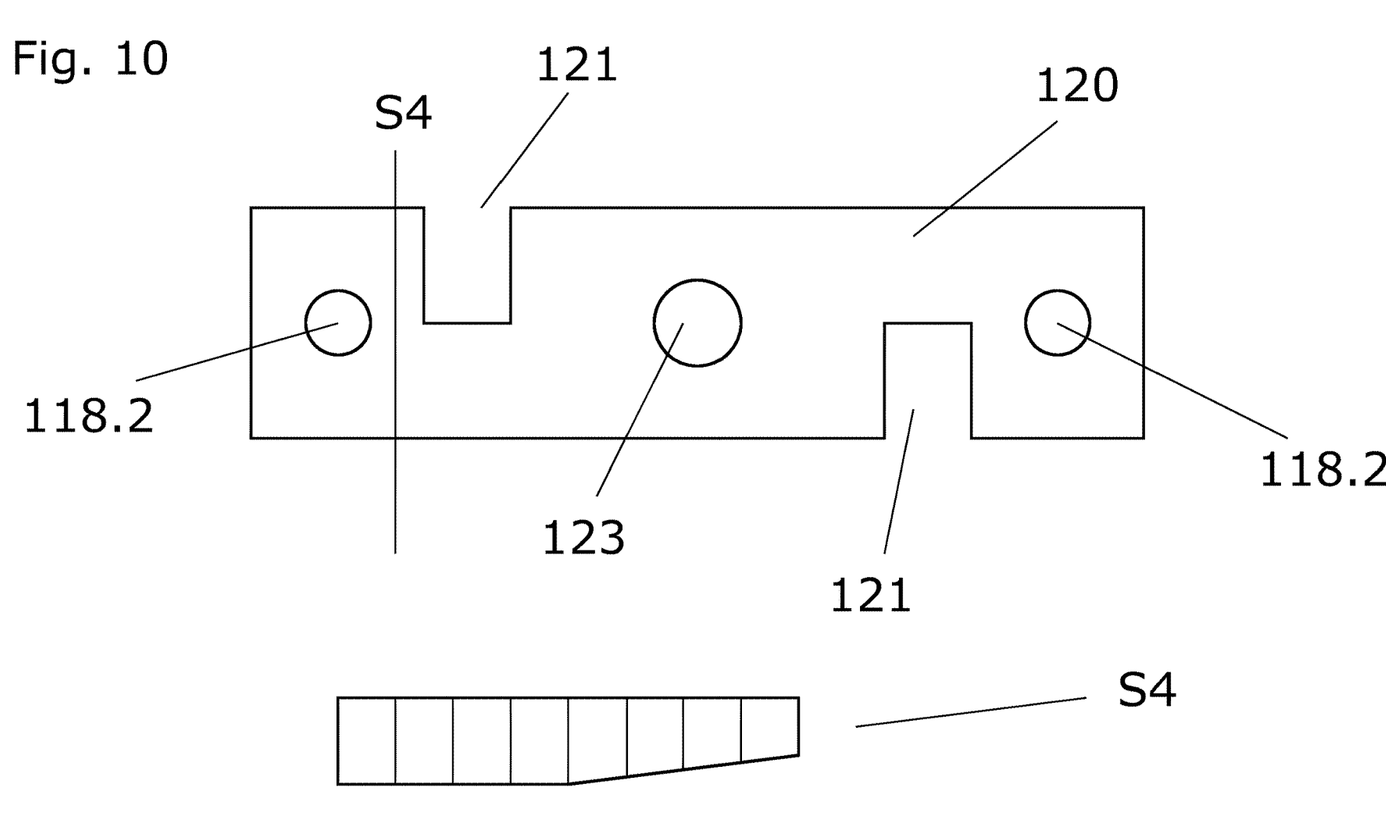
FIG. 10 shows, by way of example, a holding element of an interface of the present disclosure.

FIG. 4 shows an alternative embodiment of the first support and the second support in a view taken with the cutting plane S3 of the right lower view of FIG. 8, wherein the first support 114.1 is arranged centrally between two second supports 114.2. The first support is embodied as a radial support RS, which is adapted to support a holding element movable rotatably about a radial support axis RSA, wherein the holding element 120, as shown in FIG. 10, has, in this case, two seats 121 for receiving process connectors.

Figure 5:
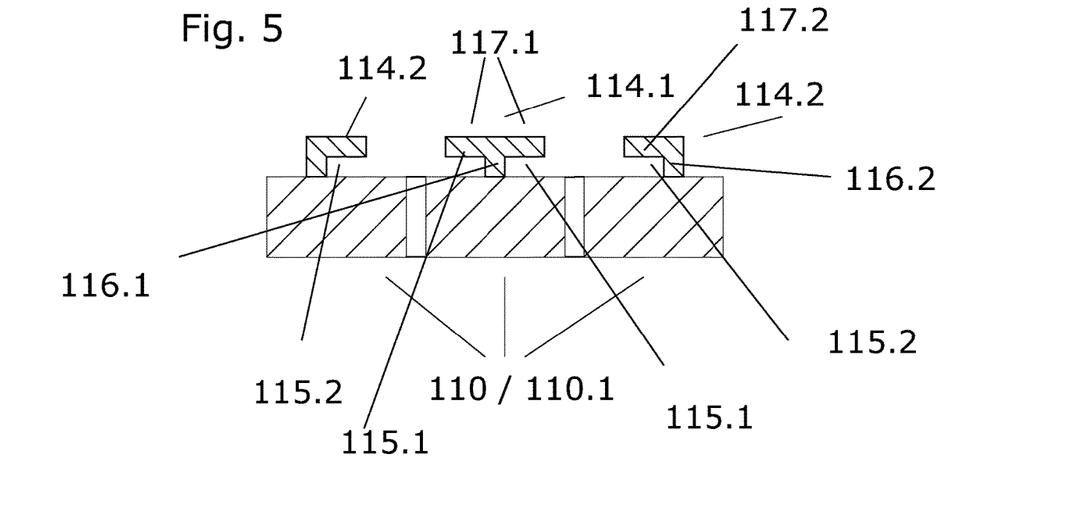
FIG. 5 shows an example of a section through a first support or second support taken with a cutting plane shown in FIG. 8.

FIG. 5 shows another embodiment of the first support and the second support in a view taken with the cutting plane S3 of the left lower view of FIG. 8, wherein the first support 114.1 is arranged centrally between two second supports 114.2.

Figure 12:
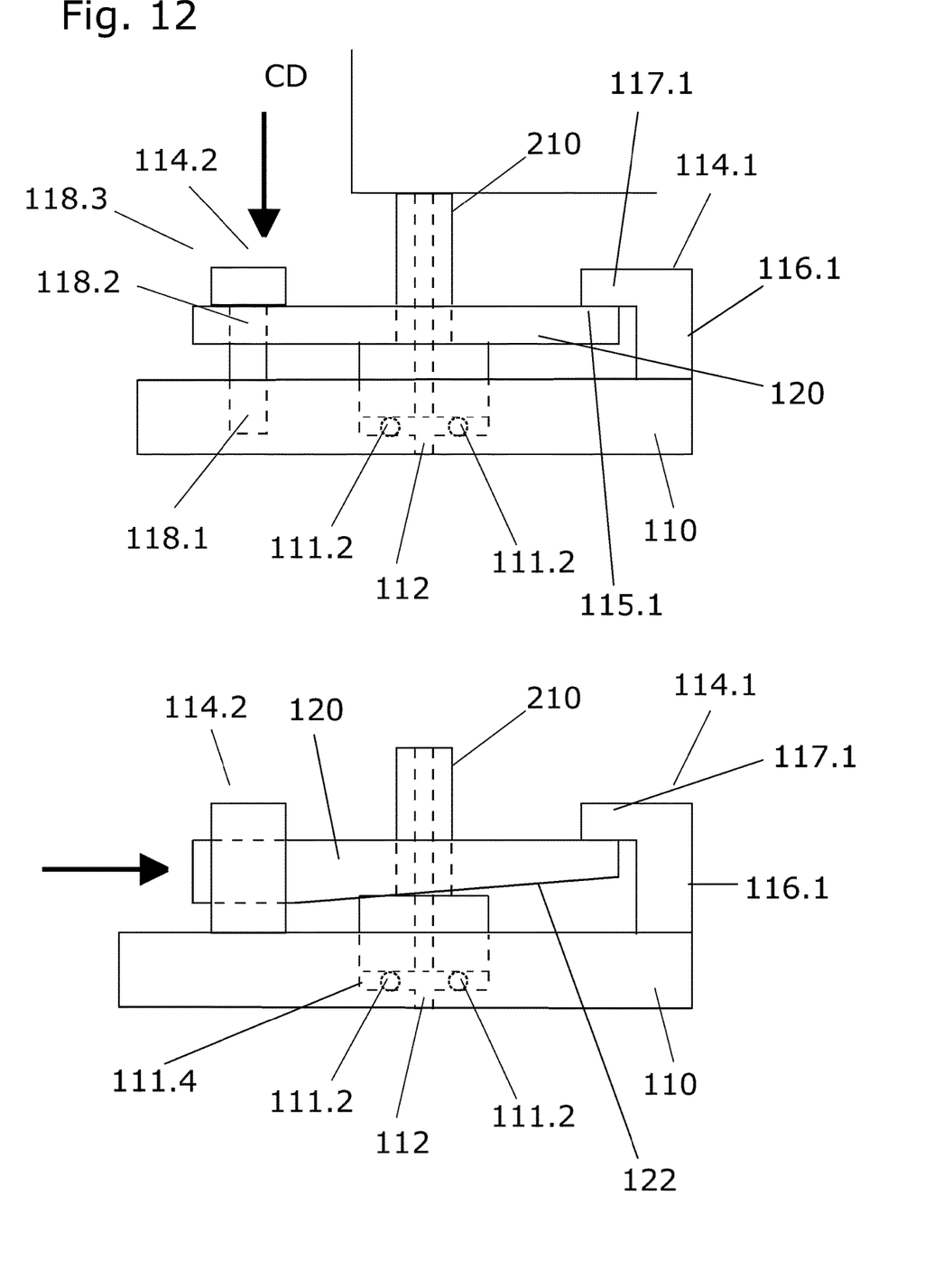
FIG. 12 shows examples of assembly of a holding element with a process connector in a modular fluid measurement system of the present disclosure.

The first support defines support surfaces for two holding elements, which, such as, for example, shown in FIG. 12, are supported by the first support 114.1 and a respective second support 114.2.

At least one second support can, alternatively, also have a first bore with a screw according to the middle view of FIG. 3.

Figure 6:
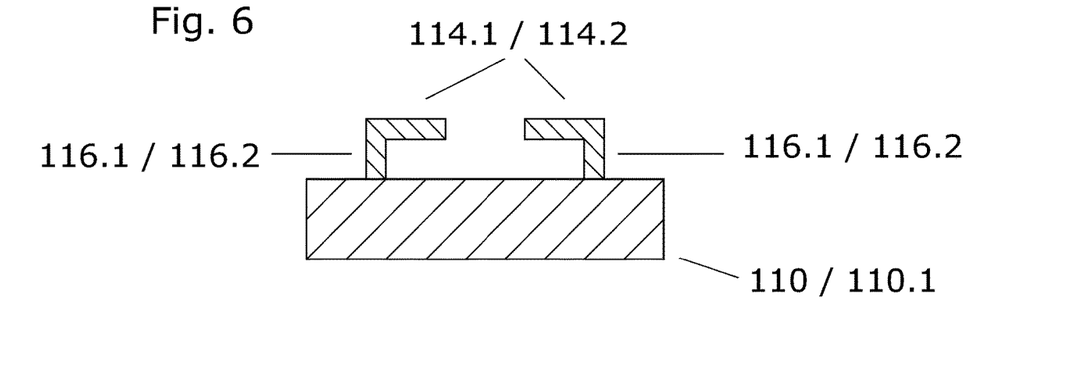
FIG. 6 shows an example of a section through a first support taken with a cutting plane shown in FIG. 8.

FIG. 6 shows an alternative embodiment of a first support 114.1, or second support 114.2, in a view taken with a cutting plane S2 of FIG. 8. The first support, or second support, includes two first projections 116.1, or second projections 116.2, with, in each case, a first cantilever 117.1, or second cantilever 117.2, which are opposite one another in the cutting plane S1. In such case, a holding element can be pushed along the cutting plane S1 through a tunnel defined by the cantilevers.

Figure 7:
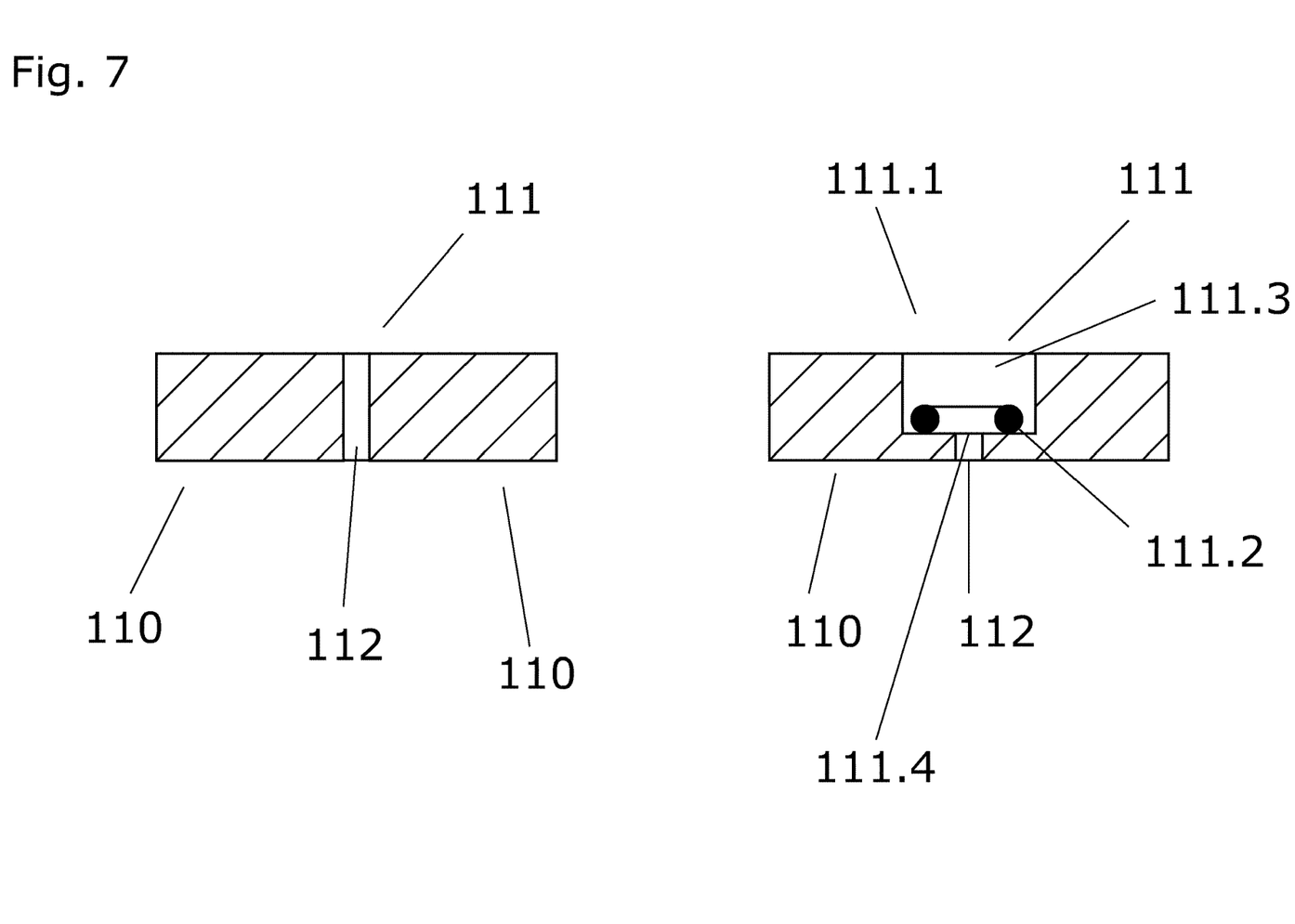
FIG. 7 shows sections through terminal openings of fluid ducts.

FIG. 7 shows examples of sections through a body 110, or body element 110.1, through terminal openings of fluid ducts 112, wherein, in a first case, the body 110 has no counterbore, and a process connector must be pressed accurately against the region of the terminal opening.

In a second case, the body can have in the region of the process connector location 111 a counterbore 111.3, which forms a seal seat 111.4 for receiving a process connector.

Arranged in the counterbore can be a seal 111.1, e.g. a sealing ring 111.2. Shape of the counterbore 111.3 is, for example, at least sectionally complementary to an outer shape 212 of the process connector, in order to assure a tight seating of the process connector perpendicular to a connection direction of the process connector.

FIG. 8 shows by way of example orientations and embodiments of first supports 114.1 and second supports 114.2 on interfaces of the invention relative to fluid ducts, about which they are arranged, wherein the supports are arranged on a body 110, or a body element 110.1, of the interface on opposite sides of an associated terminal opening of a fluid duct 112.

In a first embodiment, see left upper view, the body has two fluid ducts 112, about which are arranged, in each case, a first support 114.1 and a second support 114.2, wherein the supports are arranged along a line, wherein the first supports are arranged between the terminal openings of the fluid ducts. In a second embodiment, orientations, in each case, of a first support and a second support are in parallel with one another along different lines, see right upper view.

Alternatively thereto, it is possible to associate two second supports with one first support, such as shown in the lower views of the drawing. In the left lower view, the first support 114.1 has a first projection 116.1 with two first cantilevers 117.1, such as shown in FIG. 5, wherein each first cantilever provides a first support surface for a holding element, thus two holding elements are used.

The right lower view shows an interface, in the case of which a first support 114.1 defines a radial support axis RSA, about which the holding element 120 is rotatably supported, as shown in FIG. 4.

Figure 9:
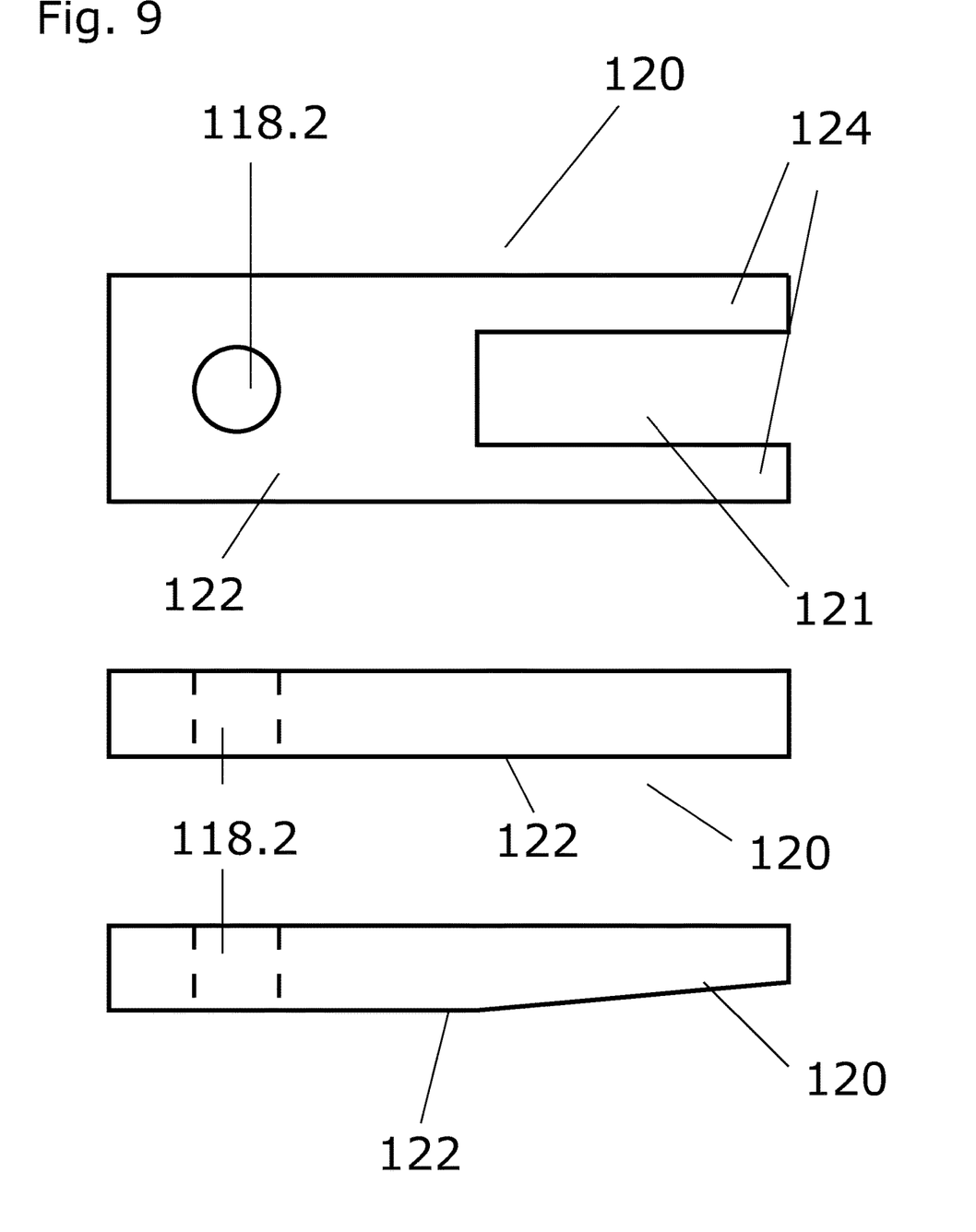
FIG. 9 shows, by way of example, a holding element of an interface of the present disclosure.

FIG. 9 shows an embodiment of a holding element 120, which has a second bore 118.2 for passage of a screw 118.3. The holding element includes on a side away from the bore a seat 121 for receiving a process connector, such that the end of the holding element is fork shaped and a process connector is surrounded in an inserted state by means of two tines 124.

In a side view, the holding element 120 can have a rectangular profile, such as shown in the middle view, or such as shown in the lower view, be wedge shaped in the region of the seat 121. For the case, in which the second support has no screwed assembly, the holding element can also be embodied without a second bore 118.2.

FIG. 10 shows an embodiment of a holding element 120, which has a central bore 123, in order to accommodate the first support 114.1. In the region of ends of the holding element, the holding element includes second bores 118.2, in order to be able to be secured by means of screws. The holding element includes two seats 121 for receiving separate process connectors, wherein by means of a rotary movement of the holding element around the radial support axis RSA, the process connectors can be pressed, in each case, against a connection location 111. In the region of the seats, the holding element can have an at least sectionally wedge shaped cross section, such as shown by means of the section viewed according to the cutting plane S4.

The holding element shown in FIG. 10 can also be embodied without second bores 118.2. In such case, those skilled in the art will choose second supports according to the upper view of FIG. 3.

Figure 11:
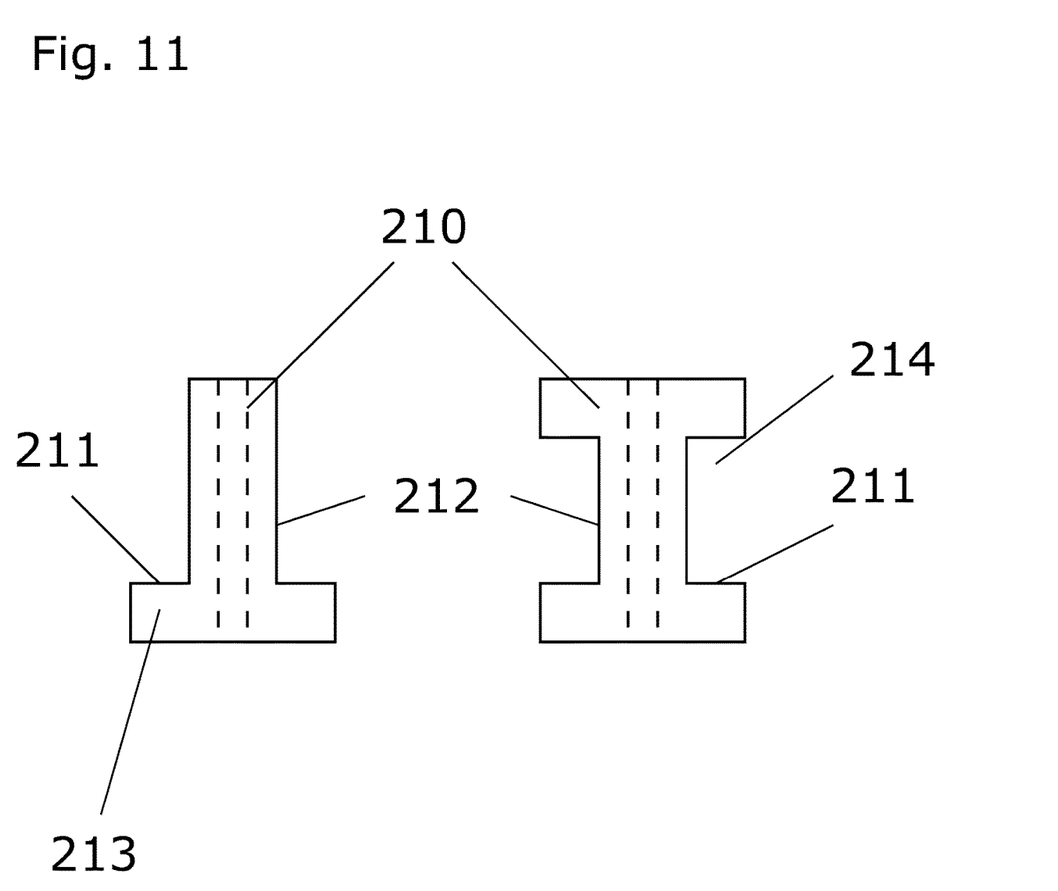
FIG. 11 shows, by way of example, process connectors of a fluid measurement point of a modular fluid measurement system of the present disclosure.

FIG. 11 shows two schematic, side views of process connectors 210, wherein the process connectors have bearing surfaces 211, by means of which a shape interlocking connection between process connector and holding element is producible. An external shape 212 of the process connector can, in such case, have a projection 213 or an indentation 214, or recess 214, as the case may be.

FIG. 12 shows by way of example two securements of process connectors according to the invention by means of holding elements 120. The upper view shows a securement, in the case of which a holding element is kept in a second support 114.2 by means of a screw 118.3, which engages in a first bore 118.1. The first support 114.1 on a side of the fluid duct 112 opposite to the second support includes a first projection 116.1 with a cantilever 117.1, which defines a first support surface 115.1 for the holding element. The pressing of the process connector 210 against the interface can be achieved, for example, by introducing the holding element with the process connector in its seat such that the holding element is placed in shape-interlocking contact with the cantilever 117.1 of the first support 114.1, and then an end of the holding element far from the first support is moved in the connection direction toward the body 110. This corresponds to a rotary movement of the holding element around a first rotation axis D1 defined by the first support surface 115.1, wherein the first rotation axis D1 extends perpendicularly to the connection direction CD. This manner of assembly can be advantageous, when the second support 114.2 is not covered by a housing of a fluid measurement point, such as indicated by the outline connected with the process connector, and, thus, a free access to the screw 118.3 is assured.

The lower view of an assembly shows a first support 114.1 having a first projection 116.1 and a first cantilever 117.1 and a second support 114.2, which is embodied, for example, as shown in FIG. 6. The holding element has sectionally a wedge shape, wherein in the region of the wedge shape a surface of the holding element 122 facing the body is inclined from the connection direction. The wedge shape enables engaging of the process connector by means of the tines of the seat of the holding element of FIG. 9 and loose contacting of the first support by the holding element. A further pushing in, such as indicated with the arrow, then lessens, firstly, a clearance of the process connector in parallel with the connection direction and leads, finally, to a compression of the process connector against a seal in the seal seat 111.4 of FIG. 7.

In corresponding manner, the process connectors of a fluid measurement system with an interface can also be pressed with a holding element of FIG. 10 against connection locations.

Those skilled in the art can combine the embodiments shown in FIGS. 3 to 12, in order to adapt to desired requirements.

The invention claimed is:

1. An interface configured for connecting a fluid measurement point, the interface comprising:
a body including at least two connection locations, wherein the body includes fluid ducts, each of which includes a connection location of the at least two connection locations, wherein the fluid ducts have at their respective connection locations first duct axes,
wherein the at least two connection locations are configured to enable connecting process connectors from a connection direction as to provide sealed communication with the fluid ducts, wherein the fluid ducts are configured to supply and drain a medium to and from the fluid measurement point via the process connectors; and
a holding element configured to releasably secure at least one process connector to the body, wherein the holding element has at least one process connector seat, wherein the holding element is configured to be translated into an end position to effect securing the at least one process connector to the body,
wherein the body includes for each connection location a first support and a second support on opposite sides of the connection location, wherein the first support and the second support are configured to support the holding element at least in the end position, wherein the first support and the second position are configured to provide holds in the connection direction against movement away from the body,
wherein the first support includes a first support surface against which a first opposing surface of the holding element is kept in the end position by shape interlocking, and
wherein the second support includes at least a second support surface against which a second opposing surface of the holding element is kept in the end position by shape interlocking.

2. The interface of claim 1, wherein the first support includes at least a first projection having a first cantilever, wherein the first projection extends above a first surroundings at least in certain regions, and wherein the first cantilever covers the first surroundings at least in certain regions, wherein the first cantilever defines the first support surface, and/or
wherein the second support includes at least a second projection having a second cantilever, wherein the second projection extends above a second surroundings at least in certain regions, and wherein the second cantilever covers the second surroundings at least in certain regions, wherein the second cantilever defines the second support surface.

3. The interface of claim 2, wherein the first cantilever and/or the second cantilever includes on a body-facing surface a rib configured to establish a rotation axis, wherein a cross-sectional profile of the rib is triangular, semicircular or semielliptical.

4. The interface of claim 1, wherein the first support is arranged between adjacent connection locations of the at least two connection locations.

5. The interface of claim 1, wherein the first support includes for the holding element a first rotation axis of the holding element extending perpendicular to the connection direction, wherein the holding element is configured to be translated from a start position into the end position by a rotational movement around the first rotation axis.

6. The interface of claim 1, wherein the second support includes a first bore adapted to receive a screw by which the holding element is securable, wherein the holding element includes a second bore adapted to receive a screw.

7. The interface of claim 1, wherein the first support is a radial support, wherein a radial support axis is in parallel with the connection direction, wherein the radial support is configured to secure the holding element against movement in a direction of the radial support axis by shape interlocking, and wherein the holding element is configured to be translated into the end position by a rotary movement around the radial support axis.

8. The interface of claim 7, wherein the holding element is at least sectionally wedge-shaped in the end position in the region of the process connector seat, wherein in the wedge-shaped section a surface of the holding element facing toward the body is inclined in the connection direction.

9. The interface of claim 1, wherein the holding element is configured to be translated into the end position by a linear movement perpendicular to the connection direction.

10. The interface of claim 1, further comprising a seal at at least one connection location.

11. The interface of claim 1, wherein the at least two connection locations each includes a counterbore, which has a seal seat.

12. The interface of claim 1, wherein the holding element is disc-shaped or plate-shaped.

13. The interface of claim 1, wherein the body comprises at least two body elements, wherein each body element has at least one connection and a respective fluid duct, wherein the at least two body elements are separately connectable with the fluid measurement point.

14. A modular fluid measurement system, the system comprising:
a fluid measurement point including at least two process connectors; and
an interface comprising:
a body including at least two connection locations, wherein the body includes fluid ducts, each of which includes a connection location of the at least two connection locations, wherein the fluid ducts have at their respective connection locations first duct axes, wherein the at least two connection locations are configured to enable connecting the at least two process connectors from a connection direction as to provide sealed communication with the fluid ducts, wherein the fluid ducts are configured to supply and drain a medium to and from the fluid measurement point via the at least two process connectors; and a holding element configured to releasably secure at least one process connector to the body, wherein the holding element has at least one process connector seat, wherein the holding element is configured to be translated into an end position to effect securing the at least one process connector to the body, wherein the body includes for each connection location a first support and a second support on opposite sides of the connection location, wherein the first support and the second support are configured to support the holding element at least in the end position, wherein the first support and the second position are configured to provide holds in the connection direction against movement away from the body, wherein the first support includes a first support surface against which a first opposing surface of the holding element is kept in the end position by shape interlocking, and wherein the second support includes at least a second support surface against which a second opposing surface of the holding element is kept in the end position by shape interlocking, wherein the holding element is configured to press at least one process connector against a corresponding connection location, and wherein the at least one process connector seat of the holding element is configured to be connected to a corresponding process connector by shape interlocking.

15. The modular fluid measurement system of claim 14, wherein the holding element is configured to contact at least one bearing surface of at least one of the at least two process connectors.

16. The modular fluid measurement system of claim 14, wherein a shape of a counterbore of each of the at least two connection locations is at least sectionally complementary to an external shape of the corresponding process connector as to make a tight seating of the corresponding process connector perpendicular to the connection direction.

17. The modular fluid measurement system of claim 14, wherein the fluid measurement point comprises a Coriolis measurement device configured to measure a mass flow and/or a density of a medium flowing through a measuring tube of the Coriolis measurement device.

* * * * *